Nov. 22, 1949 — T. A. WOOLSEY ET AL — 2,488,613
MOTOR MOUNT FOR MOTORIZED BICYCLES
Filed Nov. 28, 1947
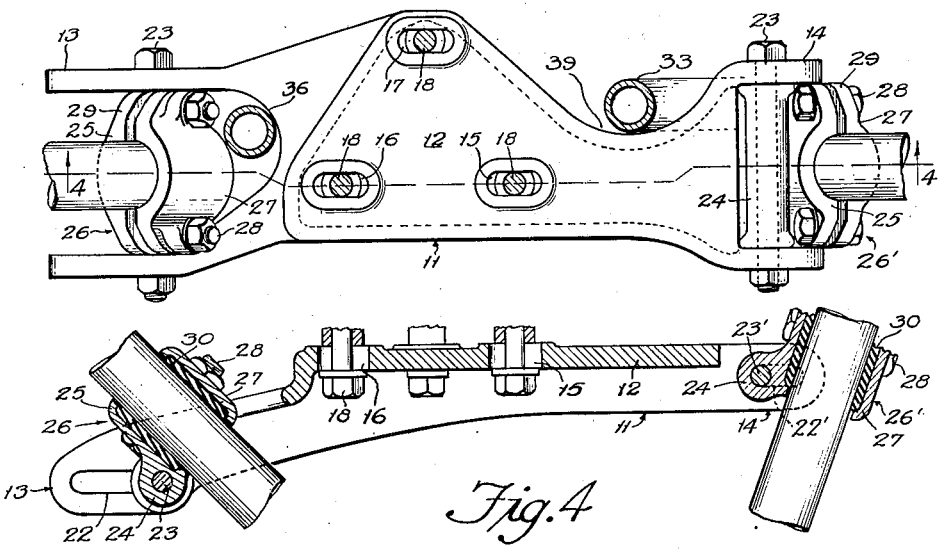
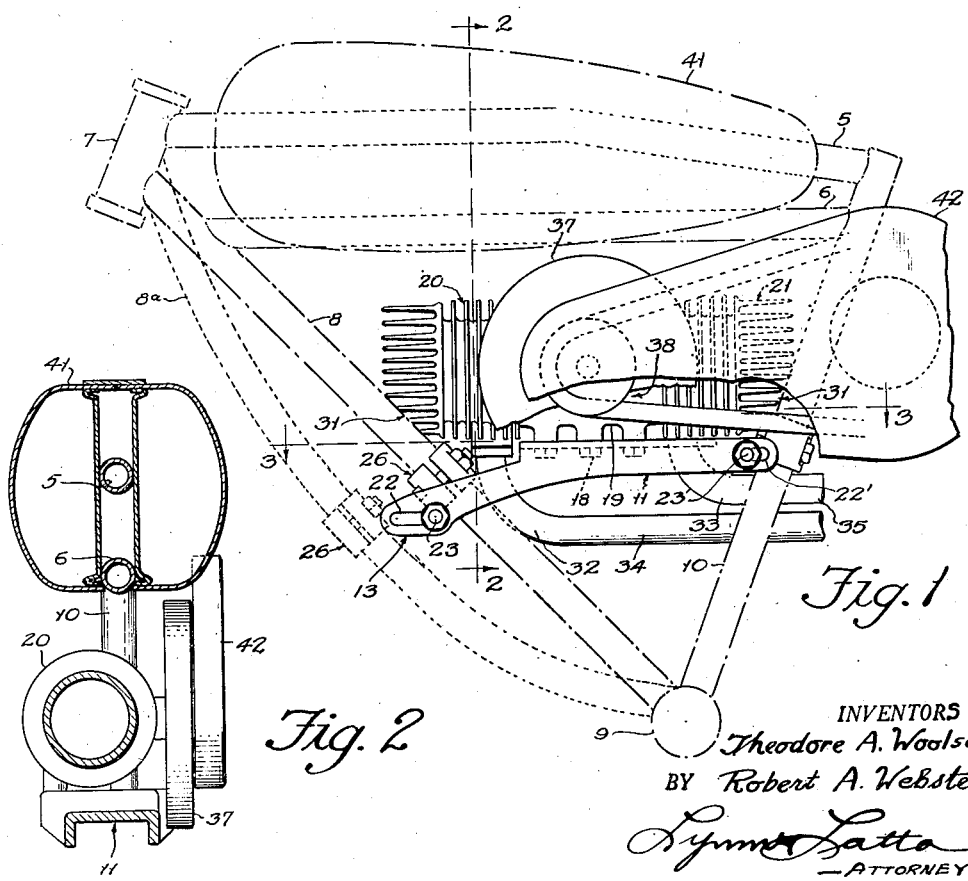
INVENTORS
Theodore A. Woolsey
BY Robert A. Webster
Lynn Latta
—ATTORNEY—

Patented Nov. 22, 1949

2,488,613

UNITED STATES PATENT OFFICE 2,488,613

MOTOR MOUNT FOR MOTORIZED BICYCLES

Theodore A. Woolsey, Pasadena, and Robert A. Webster, Santa Monica, Calif., assignors, by mesne assignments, to Jack & Heintz Precision Industries, Inc., Cleveland, Ohio, a corporation of Delaware Application November 28, 1947, Serial No. 788,768

14 Claims. (Cl. 180—33)

1

This invention relates to motorized bicycles, and, in particular, to motorizing attachments for bicycles.

The general object of this invention is to provide a motor mount that is adapted to be attached to most any standard balloon tired bicycle, for mounting a small gasoline engine or the like in the central space between the bars of the bicycle frame.

While bicycle frames are to a large extent standardized, the shape and dimensions and angularity of the tubular bars of the frame vary to a considerable extent. For example, the forward diagonal bar or "supporting bar" which extends from the front fork bearing tube down to the crank bearing, is in some cases straight and in other cases downwardly arched, with its intermediate portions lying several inches lower than the corresponding portion of the straight bar. The difference between the positions of the two bars with relation to the upright bar which extends from the seat post down to the crank bearing, may range as high as four inches.

One of the objects of the invention is to provide a motor mount which is universally attachable to the frame of any bicycle. A further object is to provide a motor mount of standardized construction for most all bicycles, capable of supporting an internal combustion engine within the triangular space between the cross bar, the supporting bar and the upright bar of a bicycle frame, utilizing such space to the best advantage for accommodating the motor and the drive from the motor to the rear wheel. In general, this means that the motor must be supported at about the same height in each case, but it may be necessary in some cases to place the motor farther forwardly or rearwardly than in other cases in order to properly center it between the supporting bar and the upright bar of the frame and obtain proper belt tension. The invention meets the problem of adapting the standardized mount to all types of frames by providing a mounting base having at least one end provided with a fork that embraces and is connected to a clamp which in turn is attachable to one of the two diagonal bars of the central frame. The furcations of such fork are adapted to straddle such bar. Where the distance between these two diagonal bars is short, the furcations of the motor base may project beyond the bar embraced by them. Where the distance between the two bars is greater, the ends of the furcations may extend just to the respective bar without straddling it. Longitudinal slots in the respective furcations provide for adjustment of the connection between the fork and a part that is fastened to the frame bar. The invention maintains the length of these slots at a minimum by providing for pivotal adjustment between the fork and the bracket clamp, whereby

2 the position of the latter may be substantially reversed so as to increase the range of adjustment provided by the slots.

A further object of the invention is to provide for adjustment in a vertical direction simply by shifting the bracket clamp up or down upon the bar to which it is attached. Since the bar is diagonally arranged, such shifting requires a corresponding horizontal adjustment between the bracket clamp and the motor base, and this is an additional reason for the provision for maximum horizontal adjustment by the combination of the slot and the reversibility of the attachment part.

A further object is to provide a motor mount adapted to coordinate, to the best advantage, the positioning of the motor, the exhaust pipes thereof, and the drive mechanism. A further object is to provide for a motor having a maximum area of cooling fin surface. In this respect, the invention takes advantage of the lesser inclination of the supporting bar as compared to the upright bar to place the forward cylinder fairly close to the supporting bar, with the forward exhaust pipe passing downwardly through the forward fork of the motor base, while the rear cylinder is spaced a greater distance from the upright bar and the rear exhaust pipe passes downwardly past the side of the motor base. The base is therefore provided with an arched form on the side where the rear exhaust pipe passes it.

Another feature of utilizing maximum space for the engine is to position the engine as high as is permitted in a double frame (frame with two cross bars). To this end, the forward fork of the motor brace is inclined downwardly and forwardly, such inclination also providing greater clearance for the forward exhaust pipe in passing through the forward fork.

Other objects will become apparent in the ensuing specifications and appended drawings in which:

Fig. 1 is a side view of portions of a motor bicycle embodying our invention;

Fig. 2 is a vertical sectional view taken on the line 2—2 of Fig. 1;

Fig. 3 is a detailed sectional view taken on the line 3—3 of Fig. 1; and

Fig. 4 is a detailed sectional view taken on the line 4—4 of Fig. 2.

To illustrate one application of the invention, we have shown in Fig. 1, in dot-and-dash lines, a bicycle having a double bar type frame including cross bars 5 and 6, front fork bearing 7, a supporting bar 8 extending diagonally downwardly and rearwardly from the front fork bearing 7 to the crank bearing 9 and joined to the forward end of the lower cross bar 6, and an upright bar 10 extending upwardly from the crank bearing 9 and joined to the rear ends of the cross bars 5 and 6. We have also shown, in dotted lines, the relative position of a downwardly arched supporting bar 8a.

The motor mount of our invention is adapted to be attached to either of the two frames indicated, and to support a motor in substantially the same relative position in either case. The motor mount base, which is indicated generally at 11, has a central platform 12, a front fork portion 13, and a rear fork portion 14. In the platform 12 are three longitudinally elongated slots 15, 16 and 17 which receive cap screws 18 for securing to the platform 12 the crank case portion 19 of the engine which has cylinder heads 20 and 21. The cap screws 18 are extended upwardly through the platform 12 from beneath and are threaded into suitable bosses in the crank case 19.

The engine is designed to utilize the upper half of the triangular space between the bars 6, 8 and 10, and to be positioned as closely as possible to the horizontal bar 6, in order that an engine of maximum length may be accommodated. Accordingly, the motor base 11 will usually be positioned about midway, vertically, between the horizontal bar 6 and the crank bearing 9. At this midlevel, the horizontal distance between the bars 8 and 10 may be as much as three or four inches greater in the case of the bicycle having the downwardly arched bar 8a than in the case of the bicycle having the straight diagonal bar 8, as indicated in Fig. 1. Consequently, an adjustment of three to four inches or more is required in order that the mount may be universal. Adjustment is provided for by constructing the fork 13 of ample length to straddle the bar 8 and to project beyond it sufficiently to reach positions that would be occupied by the bar 8a, and by providing for connecting the fork to the diagonal bar by the following means:

The two furcations of the fork 13 are provided with slots 22 extending longitudinally therein. A bolt 23 extends through the slots 22 and through a sleeve 24 formed on a member 25 of a bracket clamp 26 that is designed to embrace and be clamped upon the bar 8 (or 8a, as the case may be). The clamp 26 comprises the jaw 25, a second jaw 27, and a pair of clamp bolts 28 which extend through apertured ears 29 at the respective ends of each jaw. Each jaw 25, 27 confines a synthetic rubber sleeve 30 which provides a resilient shock mount for the unit.

The bolt 23 provides a pivotal connection between the bracket clamp 26 and fork 13, around which the clamp 26 may be adjusted so as to conform to the exact angularity of the bar 8 in any bicycle. The invention provides for reversal of the position of the clamp 26 from that shown in full lines in Fig. 1, in which it extends upwardly and forwardly and engages the diagonal bar 8 forwardly of the center of intersection of the axes of the bar 8 and platform 11, to the position shown in dotted lines in Fig. 1, in which it extends rearwardly and engages the bar 8a at a point rearwardly of the intersection of the axes of the bars 8a and motor base 11. Such provision for reversing the position of the clamp 26 makes it possible to adjust the mount to either of the two frames without the necessity of having the slot 22 the full length of the difference between the positions of the bars 8 and 8a respectively. As a matter of fact, the length of the slots 22 is less than half of such difference as measured horizontally. This is a distinct advantage, since to make the slots 22 twice as long would require an equivalent extension of the length of the fork 13 and, in addition, a considerable thickening of the walls of the fork in order to offset the weakening effect of thus extending the slots 22. An additional advantage arises from the fact that if the fork were extended as indicated, to double the length of the slots 22, it would, in the case of the bicycle with straight bar 8, extend so far forwardly of the bar 8 as to become a hazard to the rider, particularly in the likelihood of the clothing becoming caught on the projecting ends of the furcations.

The rear fork 14 is connected to the upright bar 10 by means of a clamp 26' which is preferably identical in construction with the clamp 26 in order to provide for standardized parts and thereby reduce production costs. The clamp 26' is connected to the motor base 11 by a bolt 23' which extends through slots 22' in the furcations of the fork 14. Slots 22' provide for additional extent of adjustment where necessary.

The fins on the underside of the cylinder heads 20 and 21 are shortened along diagonal lines, as at 31, to fit the inclination of the bars 8 and 10.

Such foreshortening increases the total length of the motor that can be accommodated in the central space of the frame.

The exhaust from the two cylinders of the engine is discharged through exhaust pipe elbows 32 and 33 extending downwardly from the respective cylinders, curving rearwardly and continuing horizontally in the exhaust pipes 34 and 35 respectively. The fork 13 is of sufficient depth to receive the elbow 32 which extends downwardly therethrough.

Referring now to Fig. 2, it will be noted that the platform 12 is offset to one side of the longitudinal axis of the motor base 11 which bisects the spaces between the furcations of the forks 13 and 14. Correspondingly, the rear extremity (indicated at 36) of the space embraced by the fork 13 is offset from said axis. This arrangement provides for locating the longitudinal axis of the motor at one side of the central plane of the bicycle frame so as to provide space to accommodate, on the other side of the bicycle, the flywheel 37 and the drive mechanism 38. The flywheel 37 is disposed substantially in the plane of the frame, while the drive mechanism 38 is located in a plane immediately alongside the frame. Thus, a maximum percentage of the space within the central portion of the frame is utilized, and maximum transverse compactness of the engine and drive mechanism is provided, making it easy for the legs of the rider to straddle the motor and drive mechanism.

It may be noted at this point that the three slots 15, 16 and 17 are arranged in triangular formation, with the slots 15 and 16 substantially on the longitudinal axis of the motor base 11 and the slot 17 near the extremity of the offset side of the base. This triangular arrangement permits the offset side of the base to be inclined inwardly to a considerable extent so as to provide the recess 39 which accommodates the rear exhaust pipe elbow 33, without unduly weakening the base.

The forward fork 13 of the base 11 is inclined downwardly and forwardly as shown in Fig. 1. Such inclination reduces the total necessary length of the base, since the base meets the bar 8 (or 8a as the case may be) at a point nearer to the bearing 9 and therefore farther to the rear than it would if the base were straight for its full length. The downward inclination also makes it possible for the clamp 26 to project upwardly (so as to clear the elbow 32) and yet clear the cylinder head 20.

A combined fuel tank and luggage carrier 41, embracing the bars 5 and 6, occupies the space immediately above the engine and drive mechanism and cooperates with the beltguard 42 of the latter to hold the clothing of the rider out of contact with the engine and flywheel.

We claim:

1. In a motorizing mechanism for a bicycle having a frame comprising a diagonal supporting bar, an upright bar and a horizontal bar joining the upper ends of the other two bars: a motor mount including a base for attachment to midportions of said supporting bar and upright bar, connecting means for securing the respective ends of said base to said supporting bar and upright bar, said base having an intermediate platform portion to which may be attached a motor having a flywheel and a drive pulley disposed outwardly of said flywheel, said platform portion being offset to one side of the longitudinal axis of said base, whereby to dispose the axis of said motor at one side of the plane of said frame, with said flywheel disposed substantially in the plane of said frame and said drive pulley disposed in a plane closely adjacent the other side of said frame.

2. Mechanism as defined in claim 1, wherein said connecting means are adjustable longitudinally of said base.

3. Mechanism as defined in claim 1, wherein said connecting means include a clamp and means connecting said clamp to said base for sliding movement longitudinally of the base and for pivotal movement around a transverse axis.

4. In a mechanism for motorizing a bicycle having a frame comprising a diagonal supporting bar, an upright bar and a horizontal bar joining the upper ends of said supporting bar and upright bar: a motor mount including a base having forks at its respective ends and a mounting platform intermediate said forks, a pair of clamps to embrace said supporting bar and upright bar respectively, and a pivotal connection between each clamp and its respective fork, providing for conforming said clamps to the angularity of the supporting bar and upright bar respectively.

5. Mechanism as defined in claim 4, wherein at least one of said forks provides clearance for accommodating its respective clamp in either of two alternative positions extending in directions at least 90 degrees apart.

6. In a mechanism for motorizing a bicycle having a frame comprising a diagonal supporting bar, an upright bar and a horizontal bar joining the upper ends of said supporting bar and upright bar: a motor mount including a base having a fork at one end, means for connecting the respective ends of said base to the supporting bar and the upright bar respectively, said means including a clamp adapted to embrace one of said bars and to be embraced by said fork, and a pivotal connection between said clamp and said fork for conforming the clamp to the angularity of said one bar and permitting the clamp to assume either of several positions extending from its pivot in different directions so as to vary the positioning of the clamp with reference to the base in the horizontal direction and thereby vary the adapting of the base to said one bar.

7. Mechanism as defined in claim 6, wherein said pivotal connection comprises a sleeve disposed at one corner of said clamp and transverse to the main axis of the clamp, and a bolt extending through said sleeve and having its ends mounted in said fork.

8. Mechanism as defined in claim 7, wherein the furcations of said fork have longitudinally extending slots therein, receiving said bolt and permitting adjustment of said pivotal connection longitudinally of said base.

9. Mechanism as defined in claim 6, wherein said fork is inclined downwardly and forwardly from said platform, so as to meet said one bar at a closer point than if it were extended in alignment with said platform.

10. Mechanism as defined in claim 6, wherein said platform is offset to one side of the longitudinal axis of said base, thereby to support a motor at one side of the plane of said frame and accommodate a flywheel and drive mechanism on the other side of said plane, with the drive and motor extending substantially the same distance on either side of said plane.

11. Mechanism as defined in claim 6, wherein said fork is of sufficient depth to accommodate an exhaust pipe elbow extending downwardly therethrough, rearwardly of said clamp.

12. Mechanism as defined in claim 6, wherein said fork extends downwardly and forwardly from said platform and is also extended laterally from one side of said platform so as to offset said platform to the other side with reference to the longitudinal axis of said base, and including a two-cycle internal combustion engine mounted on said base at one side of the central plane of said frame and a flywheel and drive mechanism disposed on the other side of said frame with the flywheel interposed between the drive mechanism and the motor and relatively close to the plane of the frame because of the offsetting of said platform.

13. Mechanism as defined in claim 12, including a fuel tank straddling said horizontal bar and occupying the space immediately above said engine, flywheel and drive mechanism, and wherein said drive mechanism includes a guard cooperating with said fuel tank to maintain the clothing of a rider out of contact with said flywheel.

14. Mechanism as defined in claim 1, wherein said base has at its forward end a fork comprising furcations each provided with a longitudinally extending slot, and wherein said connecting means comprises a clamp consisting in two jaws shaped to embrace and engage said supporting bar and a pair of bolts extending through openings in said jaws and arranged to draw them into clamping engagement with said bar, one of said jaws having a sleeve extending transversely to the axis of the clamp, and a bolt extending through said sleeve and having its ends extended through said slots whereby to provide a pivotal and longitudinally extensible connection between said clamp and said base.

THEODORE A. WOOLSEY.
ROBERT A. WEBSTER.

REFERENCES CITED

The following references are of record in the file of this patent:

UNITED STATES PATENTS

| Number | Name | Date |
|---|---|---|
| 656,323 | Hansel | Aug. 21, 1900 |
| 1,967,415 | Lesage | July 24, 1934 |